(12) United States Patent
Yuan et al.

(10) Patent No.: US 9,243,953 B1
(45) Date of Patent: Jan. 26, 2016

(54) SPECTROPHOTOMETRIC COLORIMETER BASED ON LED LIGHT SOURCE AND METHOD FOR REALIZING THE SAME

(71) Applicants: HANGZHOU CHNSPEC TECHNOLOGY CO. LTD, Hangzhou (CN); CHINA JILIANG UNIVERSITY, Hangzhou (CN)

(72) Inventors: Kun Yuan, Hangzhou (CN); Yiping Wu, Hangzhou (CN); Cong Wang, Hangzhou (CN); Shangzhong Jin, Hangzhou (CN)

(73) Assignees: HANGZHOU CHNSPEC TECHNOLOGY CO. LTD, Hangzhou (CN); CHINA JILIANG UNIVERSITY, Hangzhou (CN)

( * ) Notice: Subject to any disclaimer, the term of this patent is extended or adjusted under 35 U.S.C. 154(b) by 0 days.

(21) Appl. No.: 14/618,036

(22) Filed: Feb. 10, 2015

(30) Foreign Application Priority Data

Dec. 16, 2014 (CN) .......................... 2014 1 0775107

(51) Int. Cl.
*G01N 21/25* (2006.01)
*G01J 3/02* (2006.01)
*G01J 3/50* (2006.01)
*G01J 3/51* (2006.01)

(52) U.S. Cl.
CPC ................. *G01J 3/0251* (2013.01); *G01J 3/02* (2013.01); *G01J 3/501* (2013.01); *G01J 3/513* (2013.01)

(58) Field of Classification Search
CPC ........... G01J 3/0251; G01J 3/501; G01J 3/02; G01J 3/50; G01J 3/52; G01J 3/51
USPC .................................................. 356/402–425
See application file for complete search history.

(56) References Cited

U.S. PATENT DOCUMENTS

2008/0129996 A1* 6/2008 Liu ....................... G01J 3/0251 356/326

* cited by examiner

*Primary Examiner* — Abdullahi Nur
(74) *Attorney, Agent, or Firm* — Anova Law Group, PLLC

(57) ABSTRACT

The present disclosure provides a spectrophotometric colorimeter based on LED light source, wherein the spectrophotometric colorimeter includes an integrating sphere, a coupling light path, and a spectrometer. An inner wall of the integrating sphere is arranged with a composite light source consisting of eight LEDs; a sphere wall of the integrating sphere defines an incident aperture; light emitted from each LED enters an interior of the integrating sphere through the incident aperture and is irradiated onto the inner wall. The coupling light path is configured to couple light at a measurement caliber such that the light can enter an incident split and to eliminate stray light from the inner wall. After emitting out from an observation aperture of the integrating sphere, the light enters the incident split through the coupling light path and is irradiated onto a linear-array sensor after being split by a spectral light path; and different pixels of the linear-array sensor correspond to light radiation strengths at different wavelengths.

10 Claims, 7 Drawing Sheets

SPECTROPHOTOMETRIC COLORIMETER BASED ON LED LIGHT SOURCE AND METHOD FOR REALIZING THE SAME

CROSS-REFERENCES TO RELATED APPLICATIONS

This application claims the priority of Chinese patent application No. 201410775107.3, filed on Dec. 16, 2014, the entirety of which is incorporated herein by reference.

BACKGROUND

1. Technical Field

The present disclosure relates to technical fields of measurements of reflectance spectrum, and particularly, to a spectrophotometric colorimeter based on LED light source and a method for realizing the same.

2. Description of Related Art

Reflectance spectrum measurement is the basic way of color measurement, which calculates tristimulus values and other parameters of the color by obtaining the spectrum reflectance curve from the surface of the to-be-measured sample within the visible light range. Spectrophotometer is the predecessor of spectrophotometric color measurement instrument. Both the spectrophotometer and the spectrophotometric color measurement instrument are used to measure the spectrum reflectance or spectrum transmittance of the measured sample. Since various techniques about the spectrophotometer are relatively mature, the techniques are well applicable in different colorimeters. According to structures and measuring principles, the existing color measurement instruments are divided into three types:

photoelectric integrating color measurement instruments, spectral scanning color measurement instruments, and spectrophotometric colorimeters.

A photoelectric integrating color measurement instrument generally performs integral measurement of the whole visible wavelength using a single sensor without adopting light splitting principle.

A spectral scanning color measurement instrument has a structure similar to that of the spectrophotometer. This type of instrument generally adopts a 0: D geometrical condition. By rotating a grating, the instrument splits light emitted from a light source into monochromatic lights; the monochromatic lights are irradiated onto the measured sample, and then the reflection light signals are measured by a single sensor.

A spectrophotometric colorimeter does not split the light emitted from the light source. The light emitted from the light source is irradiated onto the measured sample. The reflection light from the sample is gathered and split, and is further detected by an array sensor. The spectrophotometric colorimeter can provide geometrical conditions including D:0 and 45:0. At present, most of portable color measurement instruments are spectrophotometric colorimeters.

Since color measurements have special applications and measurement features, following special considerations are required when spectrophotometric colorimeters are designed.

Firstly, spectral detection ranges of the spectrophotometric colorimeters are different. The spectral detection range of a regular spectrophotometric colorimeter mainly focuses on visible light. A spectral detection range recommended by CIE is 360-830 nm. Dividing the spectrum into a shortwave portion and a longwave portion has a small effect on the colorimetry calculation, thus, in the designs of most of color measurement instruments, the spectral detection range is set to be 380-780 nm. However, since measured samples are different, if the spectral detection ranges of the instruments are different, the measurement results may be greatly affected. Particularly, when material containing fluorescent matter is measured, whether the spectral distribution of the light source of the instrument includes UV light or not may greatly affect the measurement result.

Secondly, the shape of the reflectance spectrum from the surface of the object is generally relatively mild, and in the calculation of the tristimulus values of a color, compared with a spectrophotometer, requirement for a wavelength resolution of a spectrophotometric colorimeter is relatively low. The calculated wavelength resolution recommended by CIE is 1 nm. In applications, the wavelength resolution can be 10 nm. At present, the wavelength resolution chosen by most of spectrophotometric colorimeters is 10 nm.

Moreover, the measurement geometrical condition in the color measurement of the spectrophotometric colorimeter is much more complicate with respect to the spectrophotometer. CIE sets multiple kinds of geometrical conditions for the measurements of reflective samples and transflective samples. Different applications require different measurement geometrical conditions. Since the technical solutions of different device manufacturers are different from each other, design methods of the measurement geometrical conditions are correspondingly different. Different measurement geometrical conditions may cause differences among measurement results of these instruments. Thus, strict designs of measurement geometrical conditions are required in the designs of the instruments.

The measurement principle of the spectrophotometric colorimeter is as follows: the spectrophotometric colorimeter measures the spectrum reflectance or the spectrum transmittance of the measured object, selects the standard illuminant and the standard viewer from CIE, and obtains the tristimulus values of the color by integration. The spectrophotometric colorimeter is actually a physical colorimeter which measures the spectrum reflectance from the sample surface and calculates a series of psychological or physical parameters, including the tristimulus values X, Y, and Z of the color on the sample surface, according to the spectrum tristimulus function provided by the CIE standard color system. The spectrophotometric colorimeter mainly consists of a light source, a light splitting system, a photoelectric detecting system, an electrical control system, and a data processing system, etc.

A traditional spectrophotometric colorimeter generally adopts a tungsten halogen lamp or a xenon lamp as the test light source. The tungsten halogen lamp is the most commonly-used light source of the visible wavelength in the color measurement. Due to high stability, the tungsten halogen lamp is suitable to be used as an illumination light source or a radiometric calibration source in the color measurement. The most important characteristic of the tungsten halogen lamp is that the output spectrum line thereof is very smooth, without fractures, peaks, and depressions, as shown in FIG. 1. However, the energy of the spectrum distribution of the tungsten halogen lamp in the shortwave portion and the ultraviolet light portion is insufficient, which may cause two problems as follows. The first one is that the signal-noise ratio of the measurement signal of the shortwave portion is relatively low, which may affect the repeatability of the measurement; the second one is that the tungsten halogen lamp cannot provide ultraviolet light spectrum energy required in the measurement of the fluorescent material.

In addition, the power consumption of the tungsten halogen lamp is high, correspondingly shortening the working time of the instrument. If the tungsten halogen lamp is used as the test light source in the spectrophotometric colorimeter, optimizations should be considered aiming to the above situation. The xenon lamp has good spectrum energy distribution in the spectral ranges of visible light and ultraviolet light, as shown in FIG. 2. Many spectrophotometric colorimeters use pulse xenon lamps as illumination light sources. However, the pulse xenon lamp has high power consumption and thus has a shorter life.

With the development of the LED technology, more and more instrument manufacturers use LEDs as measuring light sources of portable spectrophotometric colorimeters. A LED light source has advantages including long life, rapid response, and low power consumption. In order to ensure that the illumination light source has sufficient spectrum distribution in the spectral range of visible light, multiple LED light sources are required to be combined to form a composite LED light source.

The State Bureau of Technical Supervision made JJG 867-1994 *Verification Regulation of Spectrum Tester* in 1994, and published JJG 595-20025 *Verification Regulation of Colorimeter and Color Difference* in 2002. The two verification regulations are respectively applied in the verifications of spectrum scanning color measurement instruments and photoelectric integrating color measurement instruments and respectively have specific test indicators. At present, no verification regulations are applied in spectrophotometric colorimeters. At present, in practical verifications, each metrological verification institution uses the verification regulation JJG 595-2002 to verify the spectrophotometric colorimeter. JJG 595-2002 provides requirements for the reproducibility detection of the colorimeter. The reproducibility detection is used for evaluating the uniformity of the illumination provided by the instrument on the surface of the measured sample. After the instrument is started and pre-heated, the instrument continuously measures a standard reference white plate eight times to verify the reproducibility. In each measurement, the instrument rotates about the white plate over 45 degrees. The indicator $\Delta l$ of the reproducibility of the measurement result is calculated according to the following equation:

$$\Delta l(u) = |u_i \overline{u}|_{max};$$

wherein $u_i$ is the $i^{th}$ measurement value of each parameter (tristimulus values, chromaticity coordinates, color difference, etc.) of the instrument, and $\overline{u}$ is the average value of the measurements.

The evaluation of the reproducibility of the instrument can be scaled as the following table:

| Item | Indicator | Scale one | Scale two |
|---|---|---|---|
| Reproducibility | $\Delta l(Y)$ | ≤1.0 | ≤2.0 |
| | $\Delta l(x), \Delta l(y)$ | ≤0.002 | ≤0.006 |
| | $\Delta l(\Delta E)$ | ≤0.5 | ≤0.7 |

Taking the spectrophotometric colorimeter with the D:8 structure shown in FIG. 3 as an example, light emitted from the illumination light source is incident on the sample surface after becoming uniform in the integrating sphere. The reflection light from the sample surface enters the sensor (detector) 2. Ideally, the incident light uniformly irradiates the sample surface after becoming uniform in the integrating sphere, which is not relative to the position of dS; and the light intensity distribution of each spot on the sample surface satisfies the Lambert distribution. However, in practical applications, since the diffusion illumination environment provided by the integrating sphere is not ideal, the distribution of the light radiation power intensity or light intensity angle of the wavelength of the light source which is irradiated to the sample surface is not uniform. In this situation, when the sample with non-uniform surface color or texture rotates at the bottom thereof, through the reproducibility detection, the uniformity degree of the illumination provided by the illumination light source on the surface of the measured sample can be evaluated. However, in the metrological verification regulation, the used measured sample is the standard white plate. Since the surface color of the standard white plate is uniform and the surface texture of the standard white plate is also relatively uniform, the surface reflection spectrum is considered to be unchanged as the position of the sample changes. In this state, when the sample rotates at the bottom thereof, the target of the detection cannot be achieved.

Therefore, in the practical detection, measured samples with non-uniform surface colors need to be chosen to evaluate the reproducibility of the instrument. The samples as shown in FIG. 4 are designed, and then a couple of white and black semi-circles are printed on a common printing paper by a printer. The diameter of the circle is 10 mm.

The samples shown in FIG. 4 are tested by Minolta spectrophotometric colorimeter CM-700D and X-Rite spectrophotometric colorimeter SP-64, both of which have the D:8 structure. The tests are taken in the SCI condition. In each measurement, the center of the measured sample coincides at the center of the measurement caliber of the instrument, the sample is rotated over 45 degrees after each measurement, and total 8 measurements are performed to evaluate the reproducibility of the instrument. The measurement results are shown in FIG. 5 in which the reproducibility $\Delta L(Y)$ respectively reaches 4.88 and 4.96. The reproducibility cannot reach the verification requirement for the color measurement instrument set in JJG595-2002.

When the white plate in the BCRA series of color plates is used as the standard white plate to verify the reproducibility of the Minolta spectrophotometric colorimeter CM-700D and X-Rite spectrophotometric colorimeter SP-64, the test results are shown in FIG. 6. Since the surface of the white plate is relatively uniform, the reproducibility $\Delta L(Y)$ respectively reaches 0.62 and 0.56. From the measurement results shown in FIGS. 5 and 6, non-uniform samples can better detect the problem about the reproducibility of the instrument.

In technical solutions provided in prior art, optimization designs are not adopted aiming to the reproducibility of the instrument, which thus needs improvement.

SUMMARY

In view of the above shortcomings of the prior art, the present disclosure provides a spectrophotometric colorimeter based on LED light source and a method for realizing the same, to improve the reproducibility of a color measurement instrument.

In order to achieve the above purpose, following technical solutions are provided.

A spectrophotometric colorimeter based on LED light source is provided, including an integrating sphere, a coupling light path, and a spectrometer;

an inner wall of the integrating sphere is arranged with a composite light source consisting of eight LEDs; a sphere wall of the integrating sphere defines an incident aperture; light emitted from each LED enters an interior of the integrating sphere through the incident aperture and is irradiated onto the inner wall of the integrating sphere;

the coupling light path is configured to couple light at a measurement caliber such that the light can enter an incident split and to eliminate stray light from the inner wall of the integrating sphere; and after emitting out from an observation aperture of the integrating sphere, the light enters the incident split through the coupling light path and is irradiated onto a linear-array sensor after being split by a spectral light path; and different pixels of the linear-array sensor correspond to light radiation strengths at different wavelengths.

An upper semi-sphere of the integrating sphere is a regular semi-sphere, a lower semi-sphere of the integrating sphere is shaped as a cone, and a cone angle is equal to 45 degrees from a normal of a bottom surface of the cone.

A diameter of the integrating sphere is 45 nm, and a size of the incident split of the spectrometer is 75*750 um.

A finger of a reference white plate is arranged at a measurement opening of the integrating sphere, a side surface of the reference white plate corresponding to the integrating sphere is a standard white plate; when the reference white plate is opened, a measured sample is measured; when the integrating sphere is closed, the reference white plate is measured.

The spectrophotometric colorimeter based on LED light source further includes a driving device, the driving device is driven by a stepmotor, and the linear-array sensor is controlled to rotate over 180 degrees by the stepmotor.

A step angle of the stepmotor is equal to 1.8 degrees; a signal is sampled each time the stepmotor rotates by 18 degrees; the signal is sampled ten times in each measurement, and the average of the sample values is used as a sample result.

A method for realizing the above spectrophotometric colorimeter based on LED light source is also provided. The method includes the following steps:

S1, light emitting from each LED entering the interior of the integrating sphere through the incident aperture and then being irradiated onto the inner wall of the integrating sphere; and S2, after emitting out from an observation aperture of the integrating sphere, the light entering the incident split of the spectrometer through the coupling light path and being irradiated onto the linear-array sensor after being split by the spectral light path, in which different pixels of the linear-array sensor corresponding to light radiation strengths at different wavelengths.

The method further comprises: driving a first gear to rotate through a stepmotor, driving a second gear to rotate through the first gear, driving a mounting plate of the linear-array sensor to rotate via pillow by the second gear; sampling a signal each time the stepmotor rotates by 18 degrees to obtain a sample signal, sampling the signal ten times in each measurement, and taking the average of the sample values as the sample result.

DETAILED DESCRIPTION

The present disclosure provides a spectrophotometric colorimeter based on LED light source and a method for realizing the same. In order to make the object, technical solution, and advantage of the present disclosure more clear and specific, the present disclosure is described in more detail below with reference to the accompanying drawings and the preferred embodiments. It should be understood that the embodiments described herein are only used to explain the present disclosure rather than to limit the present disclosure.

At first, an introduction how the change of the temperature has an effect on the spectral light path is given below.

Figure 1:
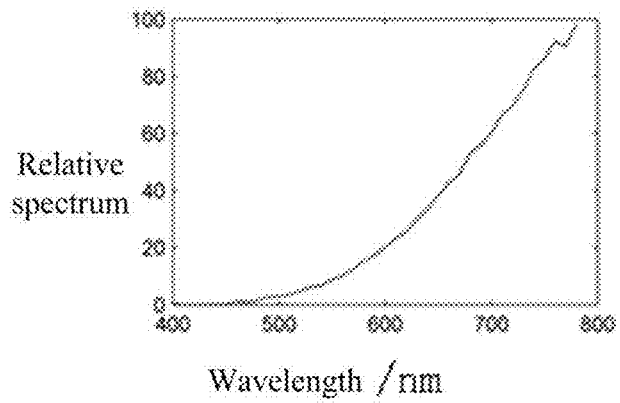
FIG. 1 is a schematic view of a tungsten halogen lamp provided in prior art.
Figure 2:
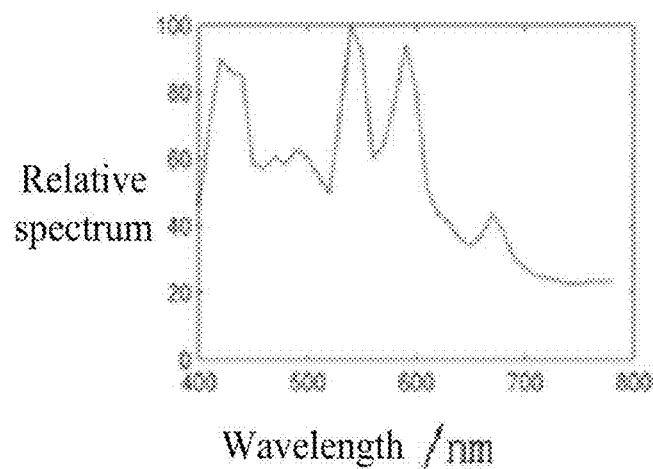
FIG. 2 is a schematic view of a xenon lamp provided in prior art.
Figure 3:
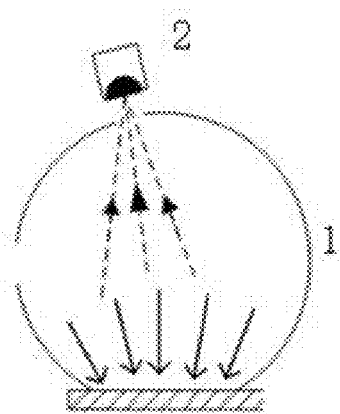
FIG. 3 is a schematic view of a spectrophotometric colorimeter with a D:8 structure provided in prior art.
Figure 4:
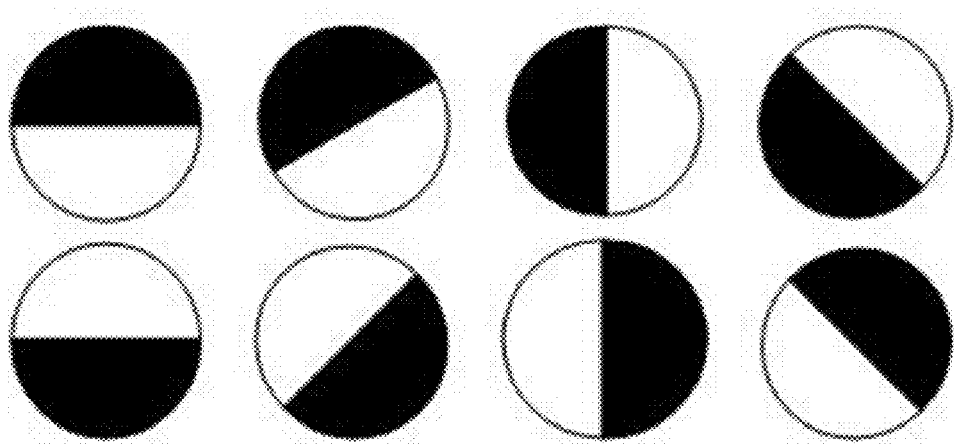
FIG. 4 is a schematic view of a sample used in a reproducibility detection.
Figure 5:
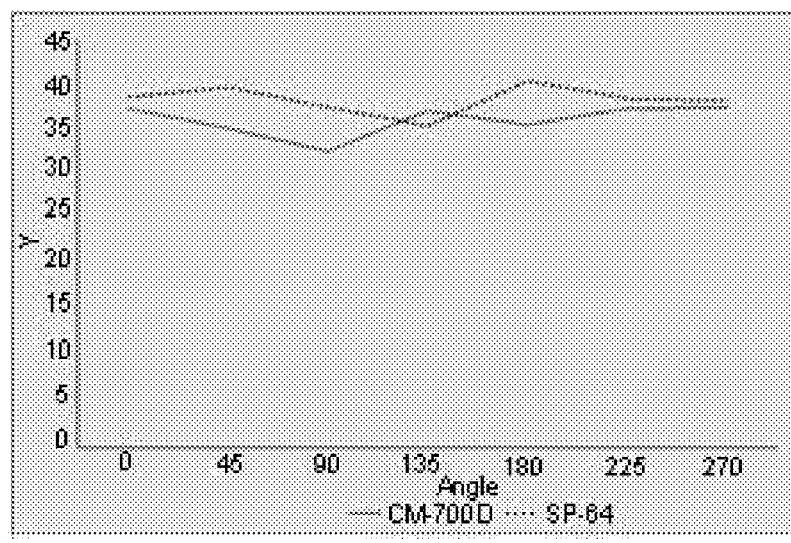
FIG. 5 is a schematic view showing a result of the reproducibility detection.
Figure 6:
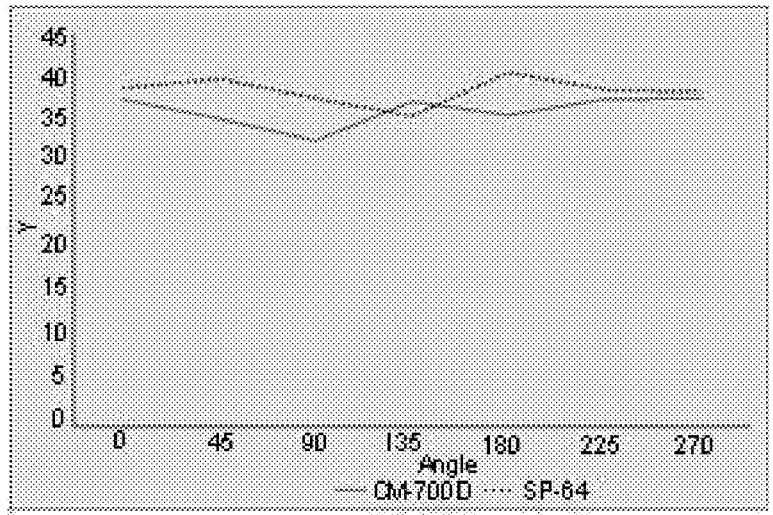
FIG. 6 is a schematic view of showing the result of reproducibility detection using the standard white plate.
Figure 7:
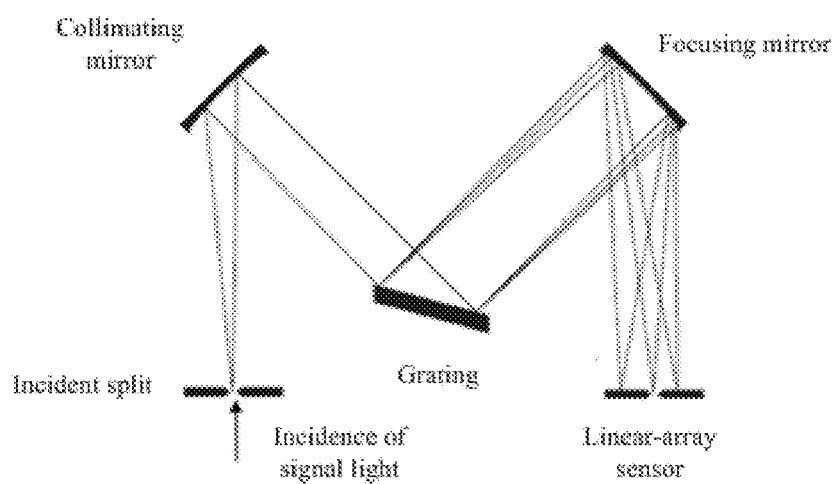
FIG. 7 is a schematic view showing that a grating is used as the light splitting device in the spectral light path.

In a spectrophotometric colorimeter, the spectral light path is used to split the signal light. Generally, a grating is used as light splitting device in the spectral light path. As shown in FIG. 7, the signal light is incident on the spectral light path and focuses on a surface of a linear-array sensor through a mirror, the grating, and a convergent mirror. The sensor at this time can measure radiation intensities of different wavelengths of the signal light. The following correspondence exists between each pixel of the sensor and the corresponding wavelength:

$$\lambda = k \cdot n + d;$$

wherein n is a serial number of the pixel of the sensor, λ is the wavelength corresponding to the $n^{th}$ pixel, K is a scale factor, and d is a constant which is determined during the calibration of the wavelength accuracy of the instrument.

As shown in FIG. 7, in the spectral light path, the relative positions between the mirror (which is indicated by a collimating mirror in the drawing), the grating, and the convergent mirror (which is indicated by a focusing mirror in the drawing) are fixed. However, when the ambient temperature changes, since the material correspondingly expands and shrinks, the relative positions between the above components is correspondingly changed. As a result, the correspondence between each pixel of the sensor and the corresponding wavelength changes as follows:

$$\lambda = k' \cdot n + d';$$

wherein k' is a scale factor and d' is a constant. An error may occur in the measurement result if the calibration of the wavelength accuracy of the instrument is not performed at this time.

In the technical solution provided in prior art, the instrument needs to be returned to the supplier such that the calibration of the wavelength accuracy of the instrument needs to be performed again. Whereas the present disclosure provides an instrument design capable of automatically calibrating the wavelength accuracy each time when the instrument is started, which avoids the measurement error of the instrument caused by the change of the temperature and also avoids the returning of the instrument caused by the above problem.

Figure 8:
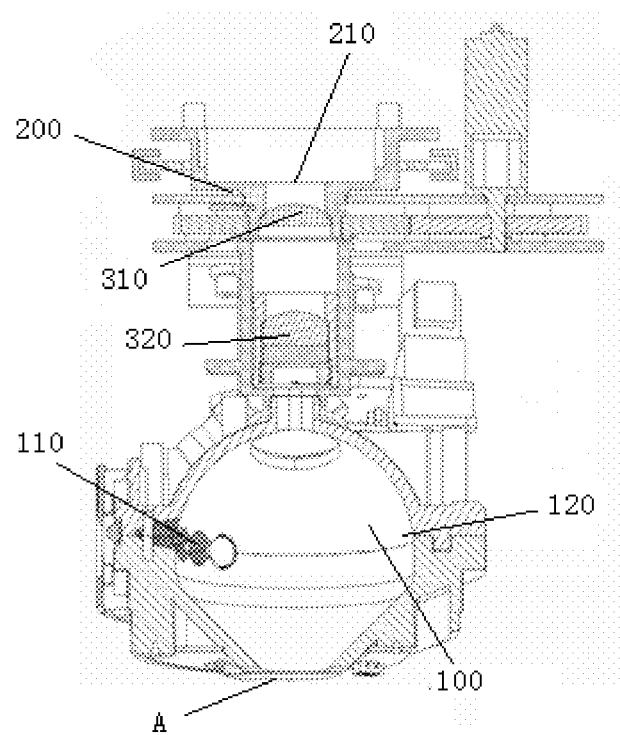
FIG. 8 is a schematic view of a spectrophotometric colorimeter based on LED light source in accordance with an embodiment of the present disclosure.

As shown in FIG. 8, the spectrophotometric colorimeter based on LED light source provided in an embodiment of the present disclosure includes an integrating sphere, a coupling light path, and a spectrometer 200. A composite light source 110 consisting of eight LEDs is arranged on an inner wall of the integrating sphere 100. An incident aperture 120 is defined in the wall of the integrating sphere 100, and light emitted from each LED enters the interior of the integrating sphere 100 to be irradiated onto the inner wall of the integrating sphere 100 through the incident aperture 120. The coupling light path is configured to converge the reflection light from the measured sample surface at a measurement caliber to an incident split 210 and simultaneously eliminate the stray light on the inner wall of the integrating sphere. The light emitted from an observation aperture of the integrating sphere enters the incident split 210 through the coupling light path. The light is split by the spectral light path and then is irradiated onto the linear-array sensor. Different pixels correspond to light radiation intensities at different wavelengths.

In the embodiment, the coupling light path includes a first lens 310 and a second lens 320. Both the two lenses are plano-convex lenses. The reflection light from the surface of the measured sample is converged to the incident split of the spectral light path through the two lenses. The light emitted from the observation aperture of the integrating sphere reaches the incident split 210 of the spectrometer through the coupling light path formed by the first lens 310 and the second lens 320. The size of the incident split 210 of the spectrometer is 75*750 um. The coupling light path can be configured to converge the light at the measurement caliber to the incident split and eliminate the stray light including the reflection light from the inner wall of the integrating sphere.

Since the instrument adopts a single light path, a finger A of a reference white plate is arranged at the measure caliber of the integrating ball; as shown in FIG. 8, a side surface of the reference white plate corresponding to the integrating sphere is a standard white plate. When the white plate is opened, the sample is measured; when the integrating sphere is closed, the reference white plate is measured. In each measurement, the white plate is closed and the reference white plate is measured, and then the white plate is opened and the sample is measured. The switching time required for the opening and closing of the white plate is considered to be short enough such that the spectrum and intensity of the illumination light source remains unchanged in the switching time. The measurement values corresponding to the reference white plate can be used to correct the measurement values of the measured sample, thereby ensuring the reproducibility of the measurement.

In the technical solution in prior art, the integrating ball is generally designed to be a symmetric sphere. However, in the embodiment of the present disclosure, an upper semi-sphere is a regular semi-sphere, and a lower semi-sphere is shaped as a cone. A cone angle is equal to 45 degrees from a normal of a bottom surface of the cone.

The reason for adopting this type of design is given as follows.

Figure 9A:
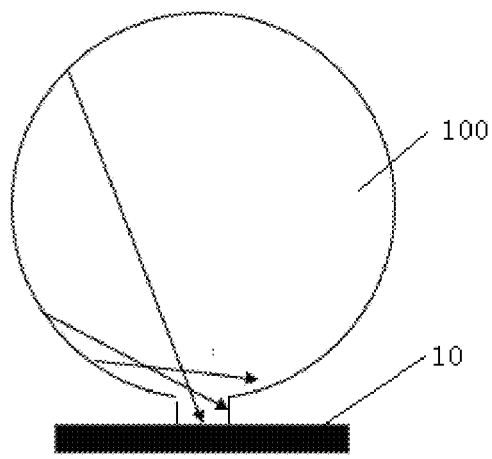
FIG. 9a is a schematic view of an integrating sphere provided in prior art.
Figure 9B:
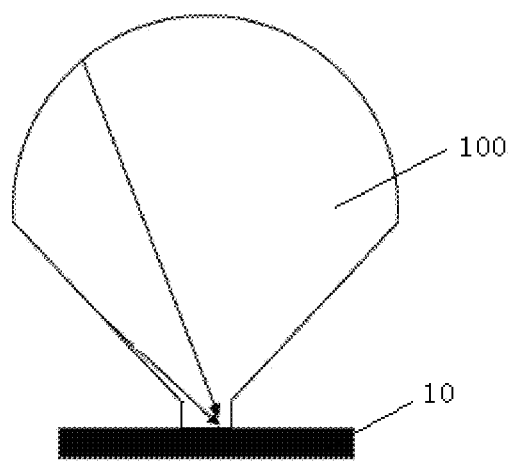
FIG. 9b is a schematic view of an integrating sphere of the spectrophotometric colorimeter based on LED light source in accordance with an embodiment of the present disclosure.
Figure 10:
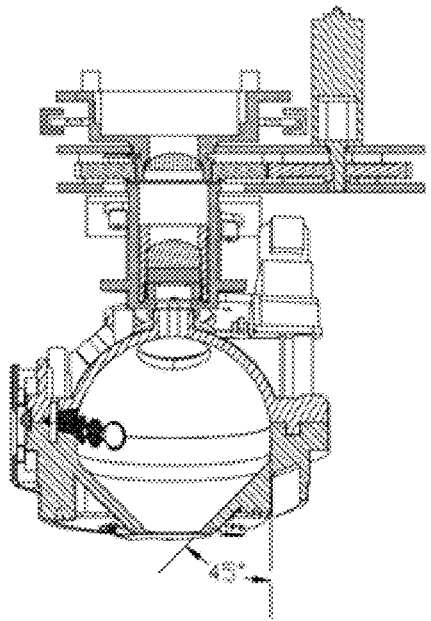
FIG. 10 is a schematic view showing that a cone angle of the spectrophotometric colorimeter is equal to 45 degrees from a normal of a bottom surface of the cone in accordance with an embodiment of the present disclosure.

The spectrophotometric colorimeter of the present disclosure has a measurement structure with a signal light path. In order to ensure the reproducibility of the measurement, the finger is arranged at the test caliber. Switching between the finger and the sample is performed in each measurement. However, the type of structure results in a long distance between the measurement hole on the bottom portion of the integrating sphere 100 and the measured sample 10, which is not beneficial to perform the diffusion illumination to the measured sample. As shown in FIG. 9, this may cause the reflection light from symmetric positions at the wall of the integrating sphere to account for a relatively large portion of the light signal entering the sensor. Due to the distance between the measurement hole of the integrating sphere and the sample, the reflection light from the inner wall of the integrating sphere cannot reach the surface of the measured sample. The measurement result of the instrument is greatly affected by gloss. In order to solve the problem, by configuring the lower semi-sphere of the integrating sphere to be a cone shown in FIG. 9*b*, the situation that the measurement result is affected by the gloss of the sample can be greatly improved. Through many experiments, it is found that, with the design that the lower semi-sphere of the integrating sphere is shaped to be a cone, the cone angle is equal to be 45 degrees from a normal of the bottom surface, and the cone is sized as shown in FIG. 10, the present invention can provide uniform illumination to the measured sample and the sample data is not easily affected by the gloss from the surface of the measured object.

Furthermore, the reproducibility of the existing color measurement instrument needs to be improved. The reproducibility of the color measurement instrument depends on the two following reasons, namely, illumination on the surface of the measured sample and gathering way of the reflection light. In the instrument using the integrating sphere to perform diffusion illumination, the light source needs to be prevented from directly irradiating the surface of the measured sample and the area of the opening is required to be less than 10% of that of the whole surface.

The gathering way of the light is the other factor affecting the reproducibility of the instrument. At present, the reason that the indicator of the reproducibility is weak is that, in the gathering of the signal light, the convergent light spot of the signal light does not match the incident split.

In the structure shown in FIG. 8, the light is converged to the incident split through the coupling light path to form a circular light spot having a diameter being about 0.8 mm. The size of the incident split of a micro spectrometer is 75*750 um. The size of the light spot does not match that of the incident split; as a result, only a portion of light can enter the spectral light path. Thus, based on the situation that the surface of the measured sample is non-uniform, the reproducibility of the measurement result is weak.

Figure 11:
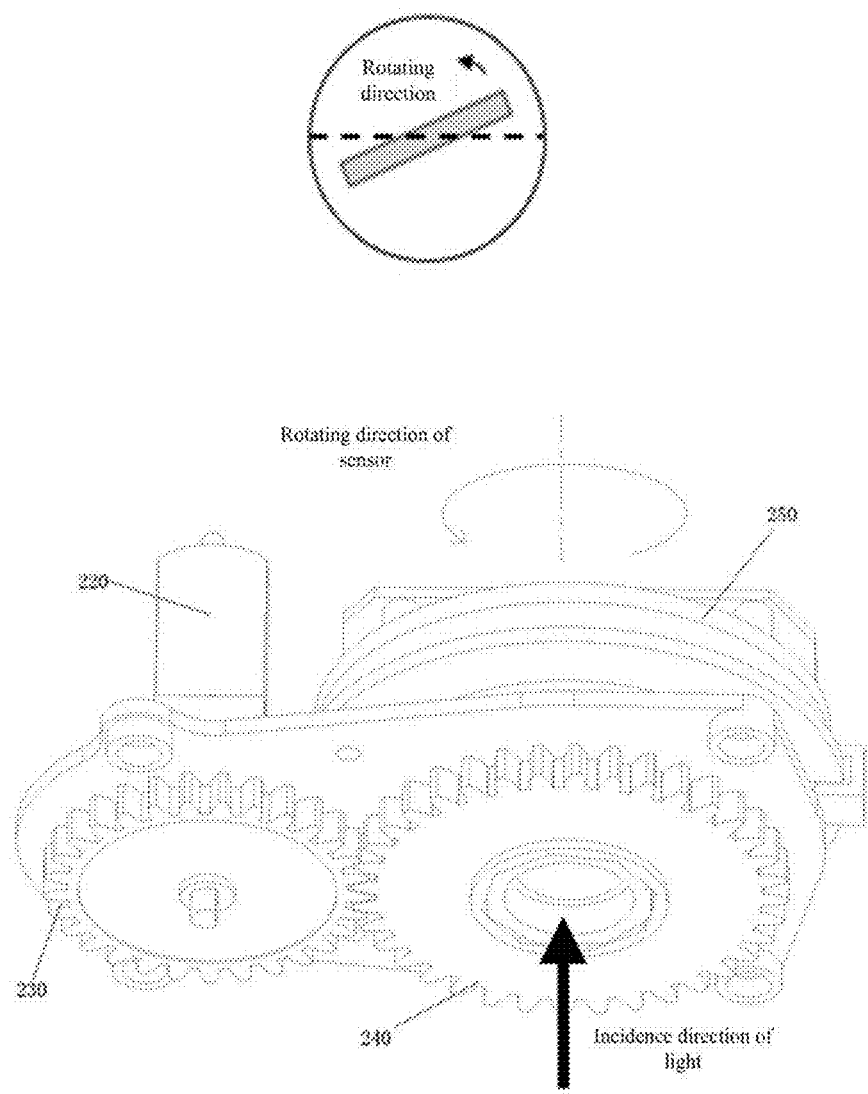
FIG. 11 is a schematic view showing that a stepmotor of the spectrophotometric colorimeter drives a sensor to rotate in accordance with an embodiment of the present disclosure.

In the design of the structure of the instrument provided in the present disclosure, a rotatable sensor is used. The rotating device is arranged in the instrument to control the incident split of the sensor to rotate, as shown in FIG. 11. Thus, the whole rotating device is driven by a stepmotor 220, and the sensor 250 can be driven to rotate over 180 degrees through the stepmotor 220. In a particular embodiment, a step angle of the stepmotor 220 is equal to 1.8 degrees, and the signal is sampled each time the stepmotor rotates by 18 degrees. The signal is sampled ten times in each measurement and the average of the sample values is used as the sample result.

Figure 12:
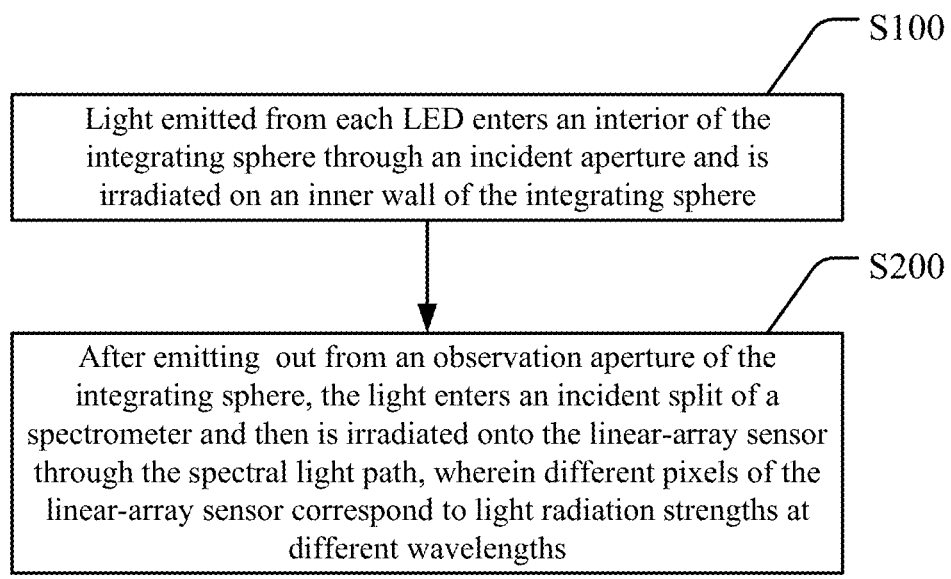
FIG. 12 is a flow chart of a method for realizing a spectrophotometric colorimeter based on LED light source in accordance with an embodiment of the present disclosure.

In detail, as shown in FIG. 12, the stepmotor 220 controls a first gear 230 to rotate, the first gear 230 drives a second gear 240 to rotate together, and the second gear 240 drives a mounting plate of the sensor to rotate through a pillow. The signal is sampled each time the sensor rotates by 18 degrees to obtain a sample signal Ii, wherein i is the number of times of the sampling operation. The signal is sampled ten times in each measurement and the average of the sample values is used as the sample result.

Through experiments, it is found that, when the average of multiple angles is used as the final sample value to measure the reproducibility detection sample, the reproducibility ΔL(Y) is 0.92, meeting the verification requirement for the color measurement instrument set in the JJG595-2002. Compared with the technical solution in prior art, the reproducibility indicator is obviously improved.

Furthermore, at present, each time when the spectrophotometric colorimeter is started, in order to ensure the stability of the instrument, a white calibration and a black calibration are performed to the instrument. In the white calibration, the spectrophotometric colorimeter is used to measure a calibrated standard white plate with a known reflectance, so that the measurement value of the instrument at the current state can be corrected to meet the standard value. In the black calibration, the spectrophotometric colorimeter is used to measure a black diffusion reflection sample. Typically, it can be considered that the spectrum reflectance of the sample at each wavelength is 0. The calibration is aimed to correct the dark signal value of the instrument. However, both the white calibration and the black calibration do not calibrate the wavelength accuracy of the instrument.

In order to solve the effect on the wavelength accuracy of the spectral light path caused by temperature drift, calibration of the wavelength accuracy of the instrument is included in the white calibration performed each time when the instrument is started.

In the white calibration, the reflectance spectrum of the selected calibrated standard white plate with a known reflectance is required to be as smooth as possible, especially the reflectance spectrum cannot be greatly absorbed in the wavelength range from 400 nm to 430 nm.

In the shown LED composite light source, seven LEDs in total as shown in the following table are used.

| Serial Number | Type | Remark | Number |
|---|---|---|---|
| LED1 | Monochromatic LED | Peak wavelength 400 nm | 1 |
| LED2 | Monochromatic LED | Peak wavelength 410 nm | 1 |
| LED3 | Monochromatic LED | Peak wavelength 430 nm | 1 |
| LED4 | Monochromatic LED | Peak wavelength 480 nm | 1 |
| LED5 | Monochromatic LED | Peak wavelength 500 nm | 1 |
| LED6 | Monochromatic LED | Peak wavelength 700 nm | 1 |
| LED7 | White LED | Color temperature 4300 K | 1 |

At first, when the instrument is out of the factory, the wavelength accuracy is measured by a standard instrument to obtain the correspondence between the peak wavelength and the corresponding pixel of the sensor, wherein is the wavelength, k is a scale factor, d is a constant, and n is the serial number of the pixel. The linear-array sensor adopted in the present disclosure includes 256 pixels, thus, n ranges from 1 to 256. After the measured sample is tested, the sample value of each pixel needs to be converted to the sample value at the corresponding wavelength.

$$\lambda = k*n + d; \quad \text{Equation One}$$

After the instrument is out of the factory, the instrument is normally at work. In the white calibration performed each time the instrument is started, the calibration of the wavelength accuracy of the instrument is included. In detail, during the process, the monochromatic LEDs are respectively turned on and the measurement of the reflection light from the standard white plate is performed. When the reflection light signal from the standard white plate, which is generated when the light emitted from each monochromatic LED irradiates the white plate, is obtained, the correspondence between the peak wavelength and the pixel of the sensor is recorded. Ideally, if ambient factors such as the temperature remain unchanged, the correspondence satisfies the above Equation One. The particular situation can be expressed according to Equation Two as follows:

$$\lambda_{LED} = k*n + d; \quad \text{Equation Two}$$

wherein $\lambda_{LED}$ is the peak wavelength of the LED, n is the serial number of the pixel, k is the scale factor, and d is the constant.

Ideally, if ambient factors such as the temperature remain unchanged, in the long-term usage of the instrument, the above operation is repeated and the correspondence between each peak wavelength and the corresponding pixel of the sensor is stable and unchanged.

However, due to the effect from ambient factors, when the wavelength accuracy is being measured, new correspondence as the following equation is obtained, wherein k' and d' are respectively the new scale factor and the new constant.

$$\lambda_{LED} = k'*n + d' \quad \text{LED Equation Three}$$

At this time, it is necessary to use Equation Three to revise Equation One by replacing k and d in Equation One with the new calibration parameters k' and d'.

The revising process is as follows: each time when the instrument is started, the standard white plate is measured. In the measurement, LED1 (the peak wavelength thereof being 400 nm), LED3 (the peak wavelength thereof being 430 nm), LED5 (the peak wavelength thereof being 500 nm), LED6 (the peak wavelength thereof being 700 nm) are respectively turned on and the reflection light signals from the standard white plate are measured to obtain the pixels of the sensor corresponding to the peak wavelengths $n_{LED1}, n_{LED3}, n_{LED5}, n_{LED6}$} of the LEDs.

Since the peak wavelengths $\lambda_{LED1}, \lambda_{LED3}, \lambda_{LED5}, \lambda_{LED6}$} of the above LEDs are known. The two groups of data are fitted using the least square method to obtain Equation Four as follows.

$$(\lambda_{LED1}, \lambda_{LED3}, \lambda_{LED5}, \lambda_{LED6})^T = k' * (n_{LED1}, n_{LED3}, n_{LED5}, n_{LED6})^T + d'$$

By fitting the two groups of data using the least square method, k' and d' in Equation Four can be calculated.

Each time when the signal is sampled, the sample signal of each pixel of the linear-array sensor is at first obtained. Through Equation Four, the sample signal of each pixel of the sensor can be converted to the energy strength at the corresponding wavelength of the measured light signal.

The present disclosure further provides a method for realizing a spectrophotometric colorimeter based on LED light source. As shown in FIG. 12, the method includes the following steps:

step S100, light emitted from each LED enters an interior of an integrating sphere through an incident aperture and is irradiated onto an inner wall of the integrating sphere;

step S200, after emitting out from an observation aperture of the integrating sphere, the light enters an incident slit of a spectrometer through a coupling light path and is further irradiated onto a linear-array sensor after being split by a spectral light path, wherein different pixels of the linear-array sensor correspond to light radiation strengths at different wavelengths.

In the embodiment, the step S200 further includes:

controlling a first gear to rotate through a stepmotor, driving a second gear to rotate by the first gear, driving a mounting plate of a spectrum sensor to rotate through a pillow by the second gear, sampling the signal each time the mounting plate rotates by 18 degrees to obtain a sample signal; sampling the signal ten times in each measurement and taking the average of the sample values as the sample result.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A spectrophotometric colorimeter based on LED light source, wherein the spectrophotometric colorimeter comprises an integrating sphere, a coupling light path, and a spectrometer;

an inner wall of the integrating sphere is arranged with a composite light source consisting of eight LEDs; a sphere wall of the integrating sphere defines an incident aperture; light emitted from each LED enters an interior of the integrating sphere through the incident aperture and is irradiated onto the inner wall of the integrating sphere;

the coupling light path is configured to couple light at a measurement caliber such that the light can enter an incident split and to eliminate stray light from the inner wall of the integrating sphere; and after emitting out from an observation aperture of the integrating sphere, the light enters the incident split through the coupling light path and is irradiated onto a linear-array sensor after being split by a spectral light path; and different pixels of the linear-array sensor correspond to light radiation strengths at different wavelengths.

2. The spectrophotometric colorimeter based on LED light source of claim 1, wherein an upper semi-sphere of the integrating sphere is a regular semi-sphere, a lower semi-sphere of the integrating sphere is shaped as a cone, and a cone angle is equal to 45 degrees from a normal of a bottom surface of the cone.

3. The spectrophotometric colorimeter based on LED light source of claim 1, wherein a diameter of the integrating sphere is 45 nm, and a size of the incident split of the spectrometer is 75*750 um.

4. The spectrophotometric colorimeter based on LED light source of claim 1, wherein a finger of a reference white plate is arranged at a measurement opening of the integrating sphere, a side surface of the reference white plate corresponding to the integrating sphere is a standard white plate; when the reference white plate is opened, a measured sample is measured; when the integrating sphere is closed, the reference white plate is measured.

5. The spectrophotometric colorimeter based on LED light source of claim 1, further comprising a driving device, the driving device is driven by a stepmotor, and the linear-array sensor is controlled to rotate over 180 degrees by the stepmotor.

6. The spectrophotometric colorimeter based on LED light source of claim 5, wherein a step angle of the stepmotor is equal to 1.8 degrees; a signal is sampled each time the stepmotor rotates by 18 degrees; the signal is sampled ten times in each measurement, and the average of the sample values is used as a sample result.

7. A method for realizing a spectrophotometric colorimeter based on LED light source of claim 1, comprising the following steps:

S1, light emitting from each LED entering the interior of the integrating sphere through the incident aperture and then being irradiated onto the inner wall of the integrating sphere; and S2, after emitting out from an observation aperture of the integrating sphere, the light entering the incident split of the spectrometer through the coupling light path and being irradiated onto the linear-array sensor after being split by the spectral light path, in which different pixels of the linear-array sensor corresponding to light radiation strengths at different wavelengths.

8. The method of claim 7, wherein the step S2 further comprises:

driving a first gear to rotate through a stepmotor, driving a second gear to rotate through the first gear, driving a mounting plate of the linear-array sensor to rotate via pillow by the second gear; sampling a signal each time the stepmotor rotates by 18 degrees to obtain a sample signal, sampling the signal ten times in each measurement, and taking the average of the sample values as the sample result.

9. The method of claim 7, further comprising the following step before step S1:

measuring the wavelength accuracy by a standard instrument to obtain a correspondence between a peak wavelength of the spectrophotometric colorimeter and the corresponding pixel of the sensor as Equation One shown below:

$$\lambda = k*n + d; \quad \text{Equation One}$$

wherein $\lambda$ is the peak wavelength, k is a scale factor, d is a constant, and n is a serial number of the pixel.

10. The method of claim 9, further comprising the following step before step S1:

measuring the wavelength accuracy after the spectrophotometric colorimeter is affected by an ambient factor to obtain a new correspondence between the peak wavelength and the corresponding pixel of the sensor as Equation Two shown below:

$$\lambda_{LED} = k'*n + d'; \quad \text{Equation Two}$$

wherein k' is a new scale factor, and d' is a new constant;

revising Equation One according to Equation Two by replacing parameters k and d in Equation One with parameters k' and d' in Equation Two;

revising process comprises: each time when the spectrophotometric colorimeter is started, measuring a standard white plate; respectively turning on LED1 with the peak wavelength thereof being 400 nm, LED3 with the peak wavelength thereof being 430 nm, LED5 with the peak wavelength thereof being 500 nm, LED6 with the peak wavelength thereof being 700 nm in the measurement, measuring reflection light signals from the standard white plate to obtain the pixels of the linear-array sensor corresponding to the peak wavelengths $n_{LED1}$, $n_{LED3}$, $n_{LED5}$, $n_{LED6}$} of LED1, LED3, LED5, and LED6;

fitting the two groups of data using the least square method to obtain Equation Three as follows:

$$(\lambda_{LED1}, \lambda_{LED3}, \lambda_{LED5}, \lambda_{LED6})^T = k' * (n_{LED1}, n_{LED3}, n_{LED5}, n_{LED6})^T + d'; \text{ and}$$

calculating k' and d' in Equation Three by fitting the two groups of data using the least square method.

* * * * *